United States Patent [19]

Witz

[11] Patent Number: 5,156,277
[45] Date of Patent: Oct. 20, 1992

[54] PACKAGE FOR CONSUMER GOODS SUSCEPTIBLE TO SHOCK

[75] Inventor: Günter Witz, Zürich, Switzerland

[73] Assignee: Gunter Witz AG, Regensdorf, Switzerland

[21] Appl. No.: 693,713

[22] Filed: Apr. 30, 1991

[30] Foreign Application Priority Data

May 4, 1990 [CH] Switzerland ............... 1512/90

[51] Int. Cl.⁵ .................... B65D 5/06; B65D 5/42
[52] U.S. Cl. ............... 206/592; 206/491; 206/524.1
[58] Field of Search ............ 220/675; 206/521, 521.2, 206/521.6, 521.7, 521.8, 585, 587, 588, 592, 427, 491, 430, 433, 434, 819, 524.1; 264/153, 139, 320, 321, 285

[56] References Cited

U.S. PATENT DOCUMENTS

| 2,808,189 | 6/1968 | Williams | 206/592 |
|---|---|---|---|
| 2,863,595 | 12/1958 | Emery | 206/587 |
| 2,870,949 | 1/1959 | Currivan | 206/592 |
| 3,016,177 | 1/1962 | Chaplin | 206/521 |
| 3,222,437 | 12/1965 | Schilling | 264/321 |
| 3,389,848 | 6/1968 | McKee | 206/593 |
| 3,420,363 | 1/1969 | Blickensderfer | 264/321 |
| 3,532,263 | 5/1969 | Goldman | 206/521 |
| 3,577,495 | 5/1971 | Pearl et al. | 264/153 |
| 3,640,668 | 2/1972 | Brown et al. | 264/321 |
| 4,269,316 | 5/1981 | Growney | 206/521 |
| 4,625,907 | 12/1986 | Mangla | 264/321 |
| 4,840,276 | 6/1989 | George | 206/521 |
| 4,844,852 | 7/1989 | Keyser | 264/153 |
| 5,005,701 | 4/1991 | Dutcher | 206/491 |

FOREIGN PATENT DOCUMENTS

| 8530488 | 1/1986 | Fed. Rep. of Germany . | |
| 2306140 | 4/1975 | France . | |
| 2107284A | 4/1983 | United Kingdom | 206/588 |
| 0363650 | 4/1990 | United Kingdom . | |

*Primary Examiner*—Willard Hoag
*Attorney, Agent, or Firm*—Ralph W. Selitto, Jr.

[57] ABSTRACT

The box-like package made of a thermoformable plastics sheet being of a one-piece, punched blank provided with folding scores. Supporting profiles are molded out inwardly or outwardly from individual regions of the blank by means of thermoforming. These supporting profiles resiliently support the packed product which is susceptible to shock; they are therefore preferably adapted to the contours of the product. The entire pack, including the supporting profiles, forms a single part, so that additional supporting inserts are superfluous. The most important advantages: saving in packaging material, dispensing with troublesome to handle additional inserts, good stackability of the sheets before assembly, readily recyclable monomaterial package.

13 Claims, 4 Drawing Sheets

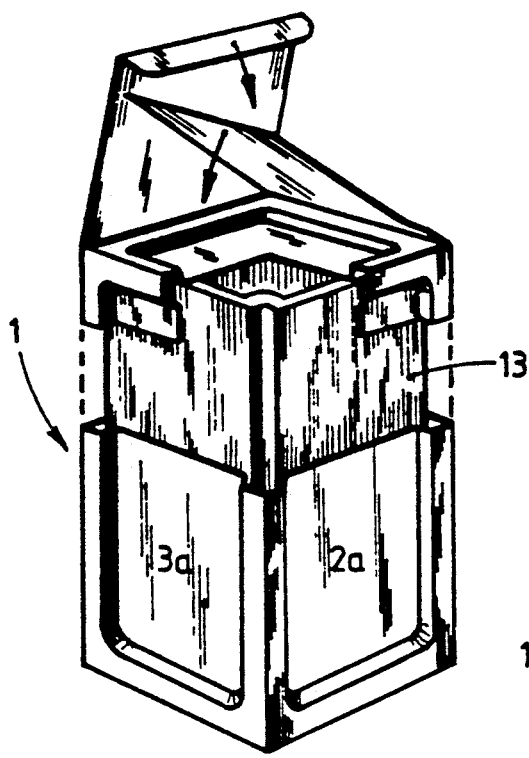
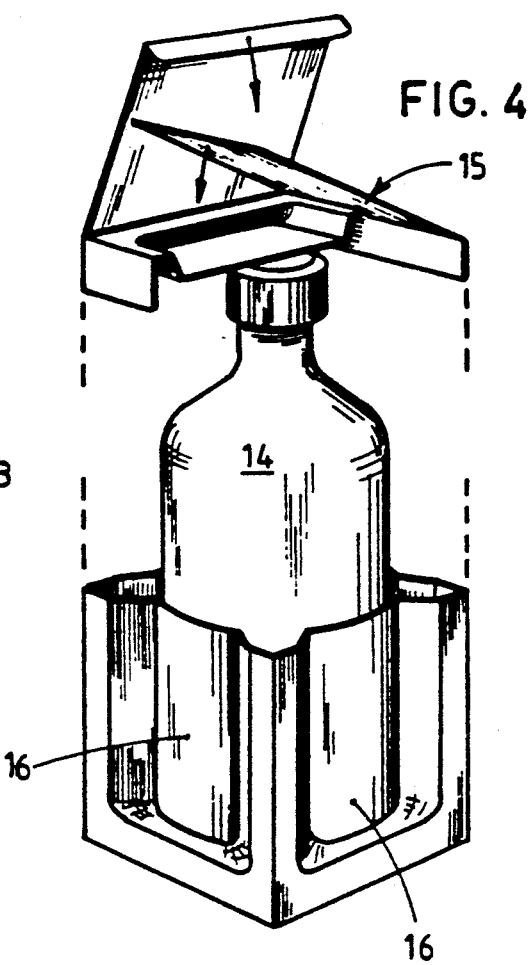
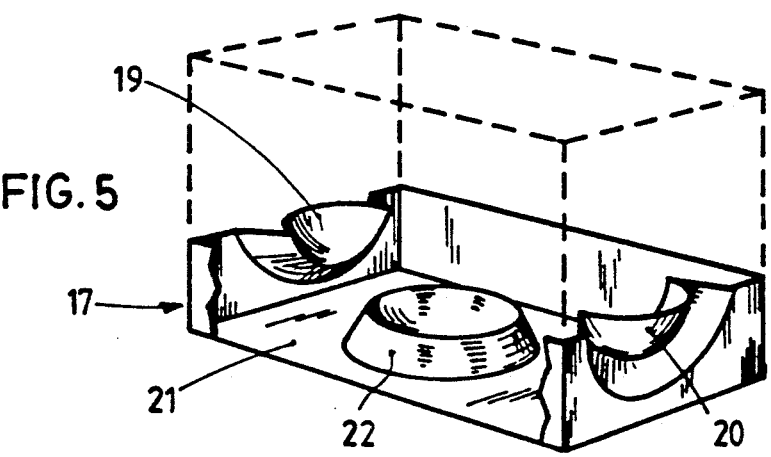
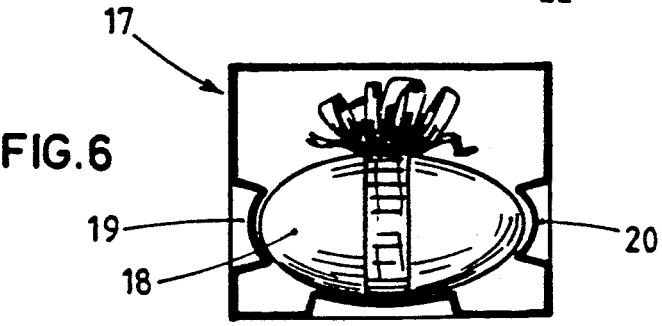

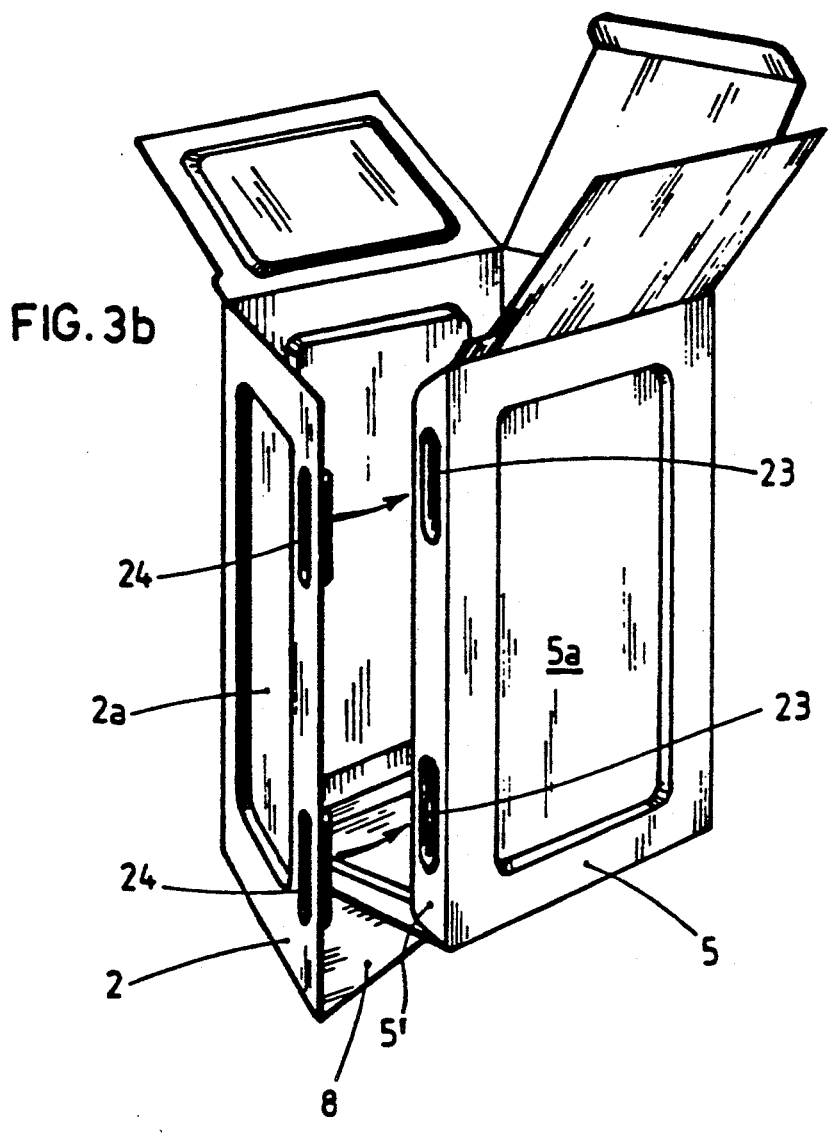

ial is disclosed by French Patent Application No. 2
PACKAGE FOR CONSUMER GOODS SUSCEPTIBLE TO SHOCK The invention relates to a process for producing a package from a thermoformable plastics sheet as well as a package produced by this process.

As is known, in many cases, packages for consumer goods are not only intended to enclose the product but at the same time support it resiliently inside the package in such a way that the product which is susceptible to shock or is fragile bears against supporting elements and is protected against shocks by their cushioning effect. The known packs, which are used, for example, for chocolate products such as Easter eggs, as well as for glassware etc., therefore have in many cases additional inserts which on the one hand bear against the inside wall of the pack and on the other hand enclose the product to be supported in a cushioning manner at at least two mutually opposite points.

In the case of this known type of package, for which German Utility Model DE-GM 85 30488 describes a possible design for example, outer pack and insert are always two separate package parts, which are usually produced from different materials, for example a cardboard outer pack, possibly with viewing window, and a thermoformed plastic insert. Another example of such a product-protecting insert made of thermoformable material is disclosed by French Patent Application No. 2 306 140. The insert described there could in principle also be used without outer pack, which however, due to the complicated outer surfaces thereby formed, produces a package which is in no way similar to a box and therefore is poor to present and awkward to take hold of and can be stacked only with difficulty.

The known product-protecting additional inserts have a number of disadvantages. They require relatively complex production and additional expenditure on material, energy, time and costs. In addition, the inserts have to be inserted separately, usually manually, when packing the product, and finally packs of this type are not stackable.

It is the object of the present invention to overcome these disadvantages of the known packs and accordingly to propose a package of the type defined at the beginning which in particular ensures the satisfactory, shock-absorbing support of the product, without additional supporting elements having to be inserted within the same, and which moreover offers a handy and appealing appearance.

This object is achieved by the invention defined in the characterizing part of patent claim 1 as well as patent claim 3. Preferred embodiments emerge from the dependent patent claims.

The integration according to the invention of thermoformed moldings, in particular supporting profiles, into a blank punched on the cardboard-box making principle and scored for folding brings very considerable advantages. For instance, the supporting profiles do not require any additional material, which results in a material saving of 30 to 50% in comparison with conventional packs provided with insertable additional elements and thus of course consequently also means correspondingly less scrap. Furthermore, the blanks, delivered flat, can be nested one inside the other and can thus be stacked well, so that little storage space is required. In addition, there is no need for separate storage of outer pack and supporting elements. Since the package is in one piece, the filling of the packaged product and the assembly of the package are also significantly simplified. What is more, the ready-assembled package can also be stacked well for sale and, moreover, is very presentable, in particular because in the design as a see-through pack (using transparent film) it can be seen into well and in a visually appealing way from all sides.

A further advantage of the package according to the invention is that it is produced from a single material, since it thus meets the increasingly topical, ecologically based requirement for packages made of monomaterials, which can be recycled without first being segregated into different materials.

The invention can be applied to all common types of box, i.e. folding boxes, telescope boxes etc., and the package may be made from transparent or colored sheet, it also being possible to choose a conductive sheet for electrical special articles.

BRIEF DESCRIPTION OF THE DRAWINGS

An illustrative embodiment of the subject-matter of the invention, including a number of variants, is described below with reference to the attached drawing, in which:

FIG. 3a shows the finished pack, containing a right-parallelepipedal ceramic vase, FIG. 3b shows a preferred way of joining the side walls abutting one another during assembly, FIG. 4 shows a further example of a right-parallelepipedal pack, which serves for receiving a bottle, FIG. 5 shows the lower section of a pack serving for receiving a chocolate Easter egg, FIG. 6 shows a corresponding side view.

Figure 1:
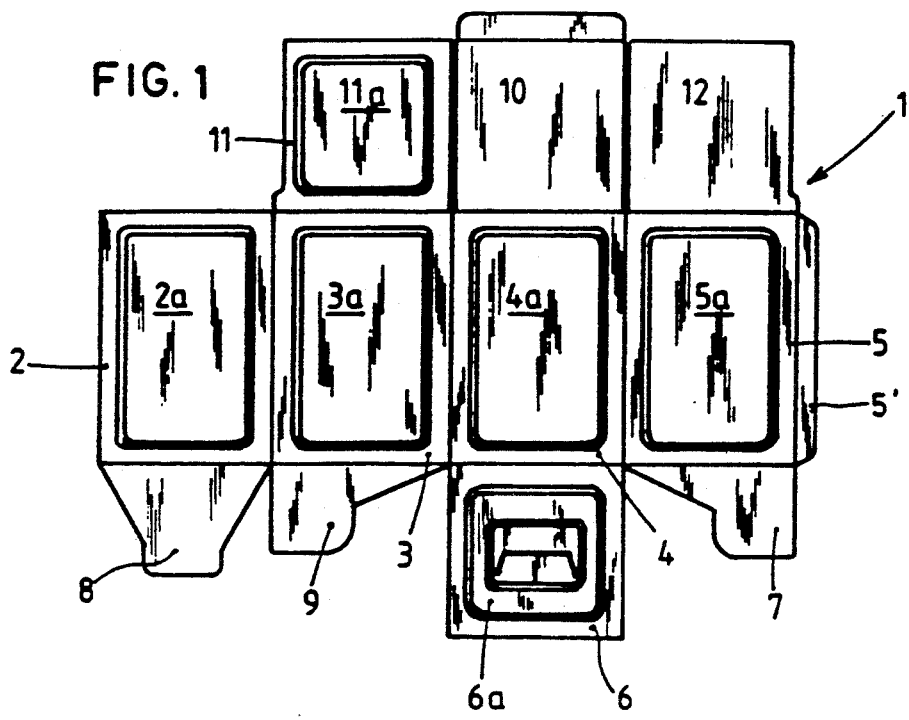
FIG. 1 shows a ready-formed and cut-to-size sheet for producing a right-parallelepipedal pack.

The sheet 1 shown in FIG. 1, which is produced, for example, from polyethylene, polyester or polyvinyl chloride and can be assembled into the right-parallelepipedal pack represented in FIG. 3a, has four side walls 2 to 5, a base 6 with the associated additional flaps 7, 8 and 9 as well as a lid 10 with a support flap 11 and an additional flap 12. All four side walls 2 to 5 are provided with an inwardly molded-in supporting profile 2a, 3a, 4a and 5a; also in the base 6 there is an upwardly protruding supporting profile 6a and in the upper supporting flap 11 a downwardly or inwardly protruding supporting profile 11a molded in. All individual elements mentioned and visible in the drawing form a single part, which has been deformed under the application of heat in a corresponding basic mold and subsequently trimmed and provided with folding scores. This part resembles a blank, as known in similar form from cardboard-box making, but provided with integrated supporting profiles (2a, 3a, 4a, 5a, 6a, 11a), produced by thermoforming.

The supporting profiles 2a to 6a and 11a are adapted to the contours of the article to be resiliently supported. In the present case, this article is a right-parallelepipedal ceramic vase 13, the smooth walls of which bear against the supporting profiles of the pack with slight resilient pressure.

Figure 2:
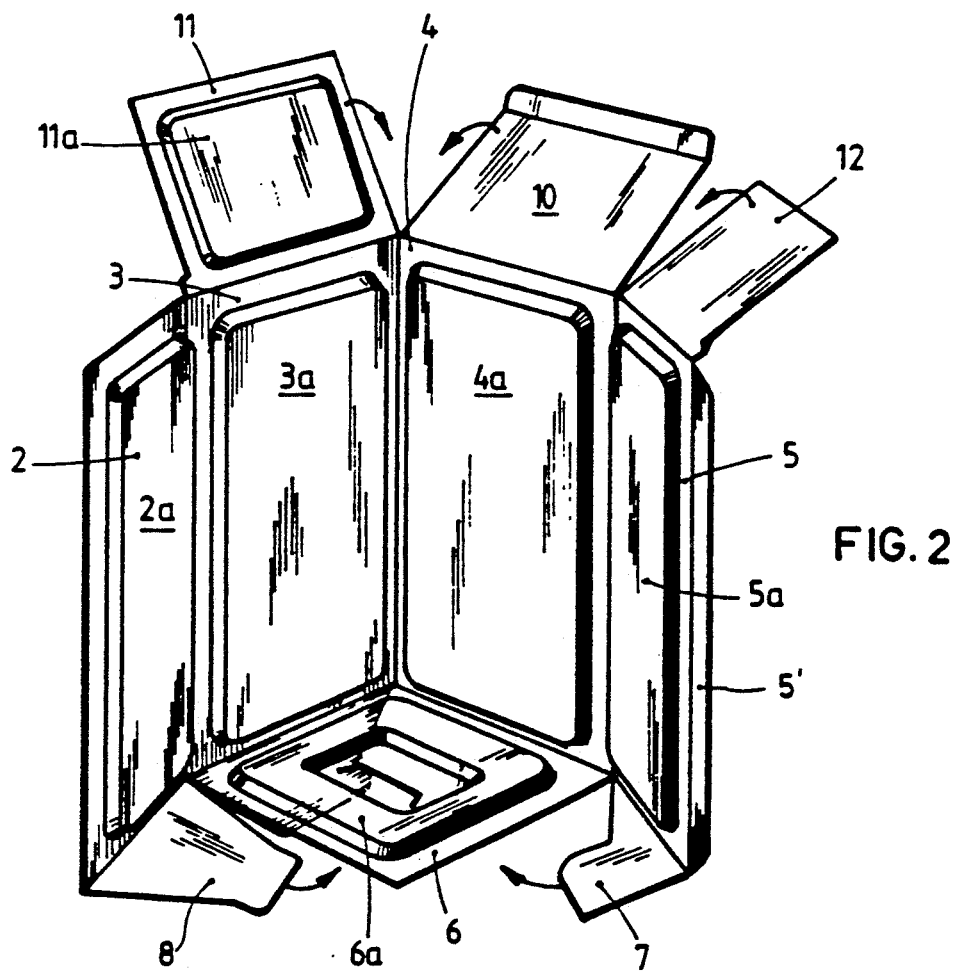
FIG. 2 shows the sheet shown in FIG. 1 during assembly into the finished pack.

In FIG. 2 it is illustrated by arrows how the sheet represented in FIG. 1 can be assembled with just a few manipulations into the pack according to FIG. 3a.

The side walls 2 and 5 abutting each other during assembly may, if need be, be joined firmly by means of a joining tab 5', for example by the joining tab 5' being welded or adhesively bonded to the side wall 2. In the case of a special embodiment (cf. FIG. 3b), for the purpose of particularly simple joining of the side walls abutting one another, special niches 23 are molded in the joining tab 5', into which niches bulges 24 correspondingly molded in the side wall 2 can be pressed in a pushbutton-like manner.

FIG. 4 shows a further example of the pack according to the invention. Here, the article which is to be inserted into the pack denoted by 15 is a bottle 14, and accordingly lateral bounding profiles 16 are molded out from the pack walls, which profiles enclose the bottle profile. In principle, it would suffice to provide two of such profiles opposite each other, whereas in FIG. 4 four profiles 16, offset by 90° in each case with respect to one another, are shown. Base and lid may in this case be molded according to FIG. 1 to FIG. 3 or else adapted even better to the outlines of bottle neck and bottle bottom.

The pack 17 shown in FIGS. 5 and 6 serves for receiving a chocolate Easter egg 18. The two mutually opposite narrow side walls are provided with curved supporting profiles 19 and 20, which are adapted to the end sections of the egg shape. The base 21, shown in FIG. 5, of the pack has a supporting profile 22 with a somewhat flatter curvature, corresponding to the egg body.

Figure 7:
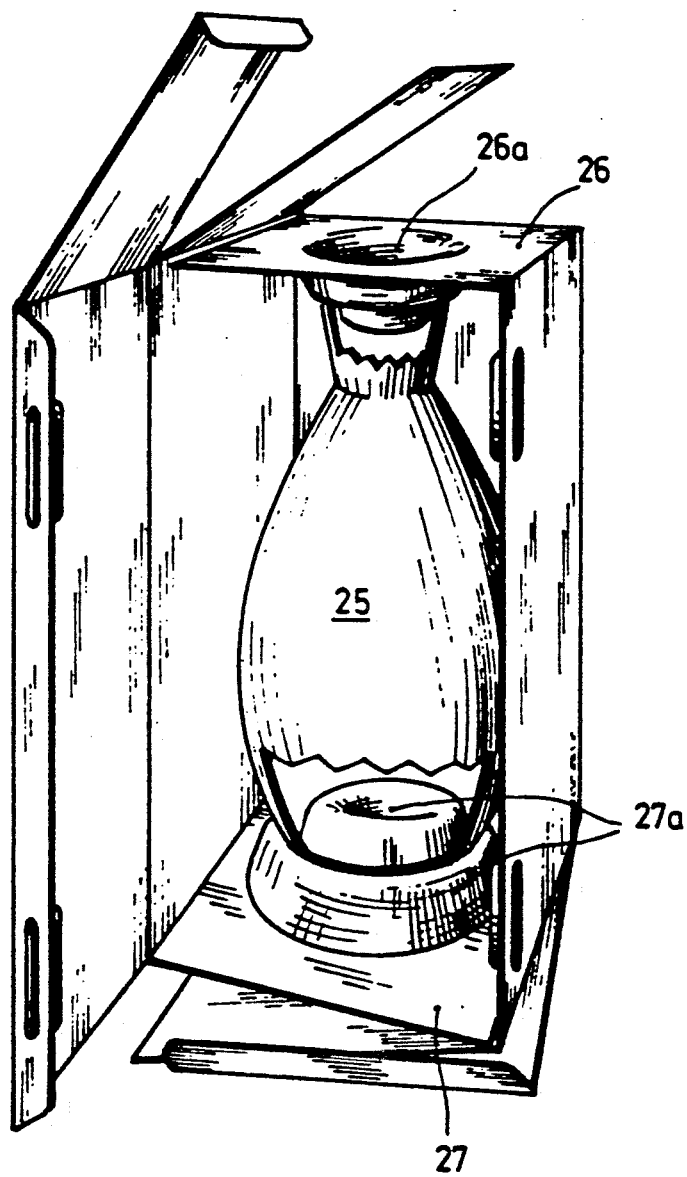
FIG. 7 shows an example of a pack which has supporting profiles only in interior blank parts.

FIG. 7 illustrates a further illustrative embodiment of a pack according to the invention, which can be used, for example, for a Chinese vase 25. In the case of this pack, only one supporting flap 26 and a base part 27 of the blank have supporting profiles 26a and 27a. The supporting profiles are molded in such a way that they also support the article laterally and thereby hold the latter firmly in its position from all sides. In this embodiment, the assembled pack produces a box with outer walls without any profiling. It can therefore be handled particularly advantageously and allows an excellent view of the packed article.

The thermoforming can in many cases be performed by means of a single basic mold, into which the profiles required by the respective shape of the article to be packed can be inserted. By simply exchanging the profiles, consequently a single basic mold can be used for the production of packs for variously shaped articles.

The process described can also be used, if need be, for producing packages which—quite irrespective of the susceptibility of the product to shock—have one or more wall portions provided with a decorative profile.

I claim:

1. A package made from a one-piece blank of thermoformable plastic having a plurality of interconnected panels separated by folding scores along which said blank can be folded and assembled into said package, comprising a body made from a first set of panels of said blank, said body being sized and shaped so as to receive an article therein and having a first end made from a second set of panels of said blank and a second end made from a third set of panels of said blank, one panel of said second set of panels being pivotally and resiliently attached to said body and including first supporting means for supporting an adjacent surface of an article received within said body in a shock-absorbing manner, said first supporting means including a first thermoformed profile which extends into said body from one side of said one panel of said second set of panels, and at least another panel of said second set of panels being arranged on an opposite side of said one panel of said second set of panels and substantially covering said one panel of said second set of panels so as the close said first end of said body, and one panel of said third set of panels being pivotally and resiliently attached to said body and including second supporting means for supporting an adjacent surface of an article received within said body in a shock-absorbing manner, said second supporting means including a second thermoformed profile which extends into said body from one side of said one panel of said third set of panels, and at least another panel of said third set of panels being arranged on an opposite side of said one panel of said third set of panels and substantially covering said one panel of said third set of panels so as to close said second end of said body, whereby an article received within said body is supported on at least two opposed surfaces in a resilient shock-absorbing manner.

2. A package according to claim 1, wherein said thermoformable plastic is selected from the group consisting of polyethylene, thermoplastic polyester and polyvinylchloride.

3. A package according to claim 1, wherein said thermoformable plastic is transparent, whereby an article received within said body is visible to an observer located externally of said package.

4. A package according to claim 1, wherein said one panel of said second set of panels is attached to one panel of said first set of panels such that said one panel of said second set of panels extends into said body in a cantilevered fashion, whereby said first supporting means is movable relative to said body, and wherein said one panel of said third set of panels is attached to one panel of said first set of panels such that said one panel of said third set of panels extends into said body in a cantilevered fashion, whereby said second supporting means is movable relative to said body.

5. A package according to claim 4, wherein said one panel of said second set of panels is not directly attached to said at least another panel of said second set of panels, and wherein said one panel of said third set of panels is not directly attached to said at least another panel of said third set of panels.

6. A package according to claim 5, wherein said at least another panel of said second set of panels includes at least a pair of panels of said second set of panels, and wherein said at least another panel of said third set of panels includes at least a pair of panels of said third set of panels.

7. A package according to claim 6, wherein said first thermoformed profile has a shape which is conformed to an adjacent surface of an article received within said body, and wherein said second thermoformed profile has a shape which is conformed to an adjacent surface of an article received within said body.

8. A package according to claim 7, wherein said first set of panels includes four panels which are sized and shaped so as to provide said body with the shape of a right parallelpiped.

9. A package according to claim 1 or 7, wherein at least one panel of said first set of panels has third supporting means for supporting an adjacent surface of an article received within said body, said third supporting means including a third thermoformed profile which extends into said body from one side of said at least one panel of said first set of panels, and wherein at least another panel of said first set of panels has fourth supporting means for supporting an adjacent surface of an article received within said body, said fourth supporting means including a fourth thermoformed profile which extends into said body from one side of said at least another panel of said first set of panels.

10. A package according to claim 9, wherein said at least one panel of said first set of panels is arranged on one side of said body, and wherein said at least another panel of said first set of panels is arranged in an opposite side of said body.

11. A package according to claim 9, wherein said thermoformable plastic is selected from the group consisting of polyethylene, thermoplastic polyester and polyvinylchloride.

12. A package according to claim 1 or 8, wherein all of said panels of said first set of panels are flat.

13. A package according to claim 12, wherein said thermoformable plastic is selected from the group consisting of polyethylene, thermoplastic polyester and polyvinylchloride.

* * * * *